UNITED STATES PATENT OFFICE.

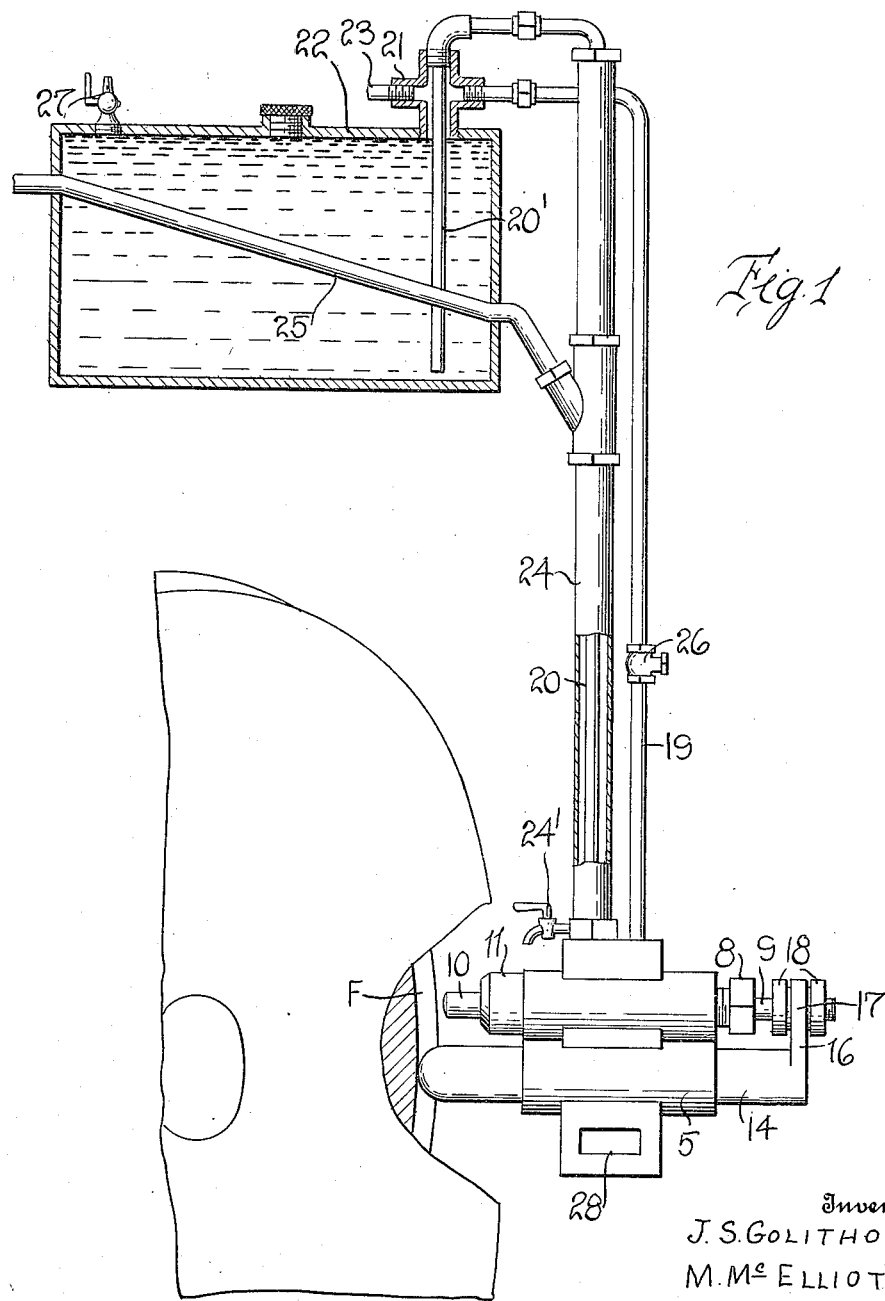

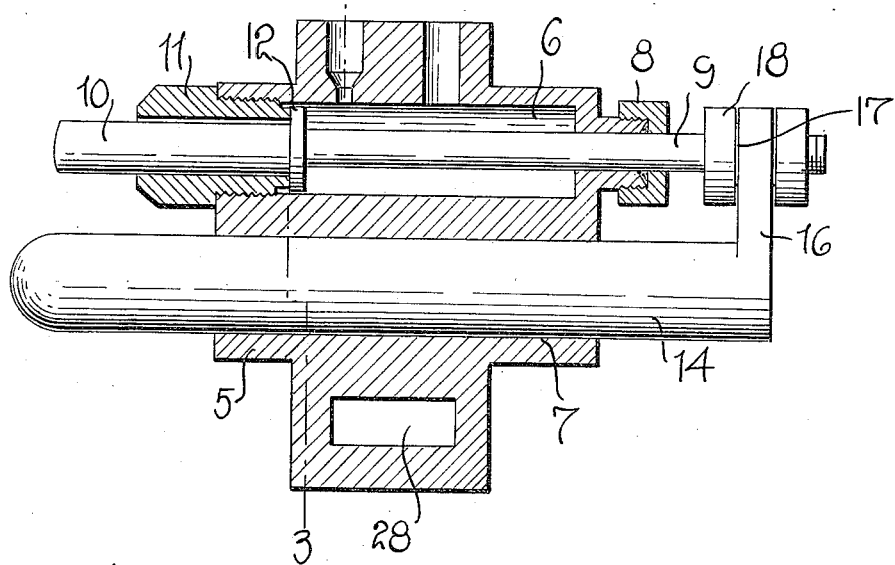
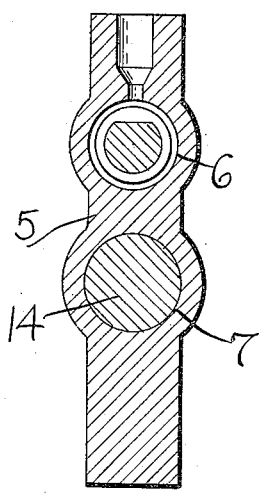
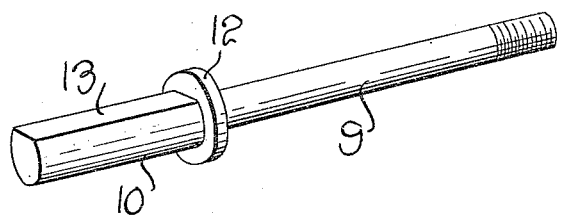

JOHN S. GOLITHON AND MAURICE McELLIOTT, OF BELLINGHAM, WASHINGTON.

WHEEL-FLANGE OILER.

1,158,798. Specification of Letters Patent. Patented Nov. 2, 1915.

Application filed July 12, 1915. Serial No. 39,413.

*To all whom it may concern:*

Be it known that we, JOHN S. GOLITHON and MAURICE McELLIOTT, citizens of the United States, residing at Bellingham, in the county of Whatcom and State of Washington, have invented certain new and useful Improvements in Wheel-Flange Oilers, of which the following is a specification, reference being had to the accompanying drawings.

This invention relates to wheel flange oilers and has for its primary object to provide a reliable and effective device for automatically oiling the wheel flanges of locomotives or street cars.

The invention has for a more particular object to provide a device of the above character including an oil applying wiper or brush normally disposed out of engagement with the wheel flange, and means engaged and actuated by the flange of the wheel when rounding a curve of the track, whereby the oil is automatically supplied to said wiper and, by the same, delivered upon the wheel flange.

The invention has for an additional object to provide a movable valve member having a stem, one end of which is disposed in juxtaposition to the wheel flange, a slidable member connected at one end to said valve and adapted for engagement at its other end with the wheel flange, said valve member being normally held closed by air pressure and moved by the shiftable member to its open position when the wheel shifts said member upon rounding a curve whereby the air expels the oil through the valve opening and upon the projecting end of the valve stem.

The invention has for an additional object to provide a wheel flange oiler which is very simple in its construction and in which friction and wear is reduced to a minimum.

With the above and other objects in view, our invention consists in the novel features of construction, combination, and arrangement of parts to be hereinafter more fully described, claimed, and illustrated in the accompanying drawing, in which, Figure 1 is a side elevation, partly in section, of a wheel flange oiler constructed in accordance with the preferred embodiment of our invention; Fig. 2 is an enlarged vertical section through the body of the oiler; Fig. 3 is a section taken on the line 3—3 of Fig. 2; and Fig. 4 is a detail perspective view of the oil applying valve member.

Referring in detail to the drawing, 5 designates the body of the oiler which is provided with two longitudinally extending chambers 6 and 7, respectively. One end of the chamber 6 is formed with a reduced extension to receive the threaded nut or cap 8 which is provided with a central opening through which the valve stem 9 is loosely disposed. This valve stem extends through the chamber 6 and, at its opposite end, is enlarged as at 10 for sliding engagement in the tubular valve seat member 11 which is disposed within the end of the chamber 6. At the inner end of the enlarged portion 10 of the valve stem, the valve disk or collar 12 is formed for engagement against the inner end of the seat member 11 to close the passage therethrough. The enlarged end portion 10 of the valve stem is formed with a plane or flattened upper longitudinal surface 13 for a purpose to be later referred to. It will be noted that the bore of the valve seat member 11 is concentric with the axial center of the chamber 6, so that the lower portion of the enlarged end 10 of the valve stem will have sliding bearing engagement against the bore of the seat member while the upper flattened surface of the valve stem is spaced from the bore of said seat member.

The chamber 7 of the oiler body 5 is open at both ends, and in the same the longitudinally movable rod 14 is disposed, said rod projecting beyond the opposite ends of the chamber. One end of said rod is rounded for engagement upon the tread of the wheel, while the other end of the rod is formed with an upwardly projecting arm 16 which is notched or bifurcated to receive a cylindrical nut or sleeve 17 threaded upon the valve stem 9, said nut being provided upon its opposite ends with the flanges or collars 18. It will be understood that, by simply adjusting this nut upon the valve stem, the bearing end 15 of the rod may be properly disposed with relation to the extremity of the enlarged end 10 of the valve.

The wall of the chamber 6 is provided with spaced ports to which the air pipe 19 and the oil pipe 20, respectively, are connected. One end of this pipe is connected to a cruciform coupling member 21 which is mounted in the top wall of an oil reservoir 22. To the opposite branch of this coupling member the air supply pipe 23 is connected. This pipe 23 supplies air under pressure to the reservoir 22 and to the pipe 19 from the storage tank on the car. The oil pipe 20 extends upwardly through a steam receiving pipe or jacket 24. The upper end of the pipe 20 is loosely disposed and then extended downwardly through the coupling member 21 and into the reservoir 22. The open end of this downwardly extending end portion 20' of the oil pipe 20 is disposed adjacent to the bottom wall of the reservoir.

25 designates a steam pipe which extends obliquely through the oil reservoir 22 and has one of its ends coupled to the jacket 24 to supply steam to the same, whereby the oil, in its passage through the pipe 20, is heated. The lower end of the jacket 24 is equipped with a drain cock 24' whereby the condensation of the steam may be drained off. A check valve 26 is also located in the air pipe 19 to prevent back-pressure through said pipe. The air entering the reservoir 22 forces the oil upwardly into the end 20' of the pipe 20 and then downwardly through said pipe into the valve chamber 6. Air also enters the pipe 19 through which it is conducted to the chamber 6 so that there is a direct pressure of air against the oil in said valve chamber. The reservoir is provided with a suitable filling opening and a valve 27 whereby the air may be released when the reservoir is filled with oil.

From the above description, the operation of the device will be understood as follows. Assuming that the car is traveling upon a straight stretch of track, both the extremity of the enlarged end portion 10 of the valve rod and the end 15 of the rod are spaced from the wheel flange directly above the tread of the wheel. In rounding a curve, however, the wheel turns to an angle with respect to its normal axis of rotation and the flange thereof, indicated at F, comes in to bearing contact with the rod 14 and moves said rod laterally through the chamber 7. In this movement of the rod, it will be obvious that, as the same is connected to the end of the valve stem 9, said valve is also moved longitudinally through the chamber 6 and the disk or flange 12 thereof is disengaged from the inner end of the valve seat member 11. The air supplied to the chamber 6 through the pipe 19 will thus force the oil out of said pipe through the passage in the valve seat member between the same and the upper surface of the valve rod upon the flattened surface portion 13 thereof, by which the oil is directed upon the wheel flange adjacent to its perimeter. This extremity of the valve rod does not, however, at any time contact with the wheel flange, so that there is absolutely no wear upon the valve stem. When the wheel again returns to its normal plane of rotation, the air pressure within the chamber 6, acting against the valve disk 12, will again force the same to its seat and close the passage through the member 11 so that the supply of oil will be cut off. It will be understood that the oil is continuously supplied to the chamber 6 as it is used. As above stated, the steam supplied to the jacket 24 heats the oil in the pipe 20 so that the same will not congeal but will be maintained in a fluid state so that it will flow readily and be easily expelled by the pressure of air in the chamber 6 when the valve is open. In this manner, it will be seen that we have produced a very simple, effective and reliable automatic oiling device for the flanges of car wheels. The body 5 of the oiler may be provided with a slotted projection, indicated at 28, or other suitable means for engagement by a clamping bracket or other form of support mounted upon the car frame.

From the foregoing description, taken in connection with the accompanying drawing, the construction, manner of operation, and several advantages of our invention will be clearly and fully understood. The several parts of the device are of exceedingly simple form and they may be very easily and quickly assembled or disassembled when necessary. The invention is positive and reliable in its operation and provides for the automatic supply of oil to the wheel flange without undue waste thereof.

While we have shown and described the preferred construction and arrangement of the several elements employed, it is to be understood that the device is susceptible of considerable modification therein and we, therefore, reserve the privilege of resorting to all such legitimate changes as may be fairly embodied within the spirit and scope of the invention as claimed.

Having thus fully described our invention, what we desire to claim and secure by Letters Patent is:—

1. In a wheel flange oiler, an oil chamber, a valve longitudinally movable through said chamber and having a stem projecting exteriorly thereof, means for supplying air to the chamber, and means connected to the valve and adapted to be engaged and moved by the flange of the wheel when the same is disposed at an angle with respect to its normal plane of rotation to move the valve to its open position, whereby the oil is expelled from said chamber by the air pressure along the valve stem and delivered from the projecting end of said stem to the wheel flange.

2. In a wheel flange oiler, an oil and air receiving chamber, a valve longitudinally movable through said chamber normally held by the air pressure in its closed position, said valve having a stem projecting exteriorly of the chamber, a sliding member arranged in parallel relation to said valve and connected to one end thereof, the other end of said member being disposed with relation to the projecting end of the valve stem for engagement by the wheel flange when the wheel is disposed at an angle with relation to its normal plane of rotation and said member moved to open the valve, whereby the oil is expelled from the chamber along the valve stem and delivered to the wheel flange.

3. In a wheel flange oiler, an oil and air receiving chamber, a valve longitudinally movable through said chamber and normally held by the air pressure in its closed position, said valve having a stem projecting exteriorly of the chamber, a slidable member connected at one of its ends to the valve stem, means for adjusting said member with respect to the valve stem to dispose the other end thereof with relation to the projecting end of the valve stem whereby said member is engaged by the wheel flange when the wheel is disposed at an angle with respect to its normal plane of rotation and thereby prevent frictional engagement of the wheel flange with the end of the valve stem, said wheel flange sliding said valve member to move the valve to open position whereby oil is expelled from said chamber along the valve stem and delivered to the wheel flange.

4. In a wheel flange oiler, the combination with an oil reservoir, of a valve body, said body having a chamber, a valve longitudinally movable through said chamber and having a stem projecting exteriorly therefrom, an air supply pipe connected to said chamber, an oil supply pipe connected to said chamber and having one of its ends extended into said reservoir, a steam jacket for said oil pipe, a steam supply pipe extending through the oil reservoir connected to said jacket, said valve being normally held closed by the air pressure in said chamber, and means connected to the valve and adapted to be engaged and moved by the wheel flange when the wheel is disposed at an angle with respect to its normal plane of rotation whereby the valve is opened and oil ejected from said chamber by the air pressure therein along the valve stem and delivered thereby to the wheel flange.

5. In a wheel flange oiler, the combination with an oil reservoir, of a valve body having a chamber therein, a valve longitudinally movable through said chamber, an oil supply pipe connected to said chamber and having one of its ends extended into the reservoir, means for supplying air to the reservoir and expelling oil therefrom under pressure through said pipe, an air supply pipe connected to the valve chamber, and means operable by the wheel to open said valve whereby the oil is expelled under pressure of the air in said chamber upon the wheel flange.

6. In a wheel flange oiler, the combination with an oil reservoir, of a valve body having a chamber therein, a valve longitudinally movable in said chamber, oil and air supply pipes connected to the valve chamber, a steam receiving jacket surrounding the oil pipe, one end of said oil pipe extending into the reservoir, a steam pipe disposed through the reservoir and connected to said jacket, means for supplying air to the reservoir whereby the oil is expelled under pressure into the valve chamber, and means operable by the wheel to open said valve whereby the oil is discharged under pressure of the air in the valve chamber upon the wheel flange.

In testimony whereof we hereunto affix our signatures in the presence of two witnesses.

JOHN S. GOLITHON.
MAURICE McELLIOTT.

Witnesses:
J. G. SWEET,
GLADY DANIEL.

Copies of this patent may be obtained for five cents each, by addressing the "Commissioner of Patents, Washington, D. C."